Feb. 14, 1956　　　　A. C. LOVESEY　　　　2,734,341
GAS TURBINE ENGINE WITH MEANS FOR
REHEATING TURBINE EXHAUST GASES
Filed April 22, 1952　　　　　　　　　　4 Sheets-Sheet 1

INVENTOR
A. C. LOVESEY
By
Wilkinson & Mawhinney
ATTYS.

United States Patent Office 2,734,341
Patented Feb. 14, 1956

2,734,341

GAS TURBINE ENGINE WITH MEANS FOR REHEATING TURBINE EXHAUST GASES

Alfred Cyril Lovesey, Littleover, Derby, England, assignor to Rolls-Royce Limited, Derby, England, a British company Application April 22, 1952, Serial No. 283,708

Claims priority, application Great Britain April 25, 1951

12 Claims. (Cl. 60—35.6)

This invention relates to gas turbine engines; such engines normally comprise a compressor delivering air to combustion equipment in which fuel is burnt to heat the air which passes through a turbine driving the compressor.

In certain uses of such engines, for example for marine or aircraft propulsion or for a stationary power plant, it becomes desirable to provide one or more additional combustion stages on the downstream side of a turbine which drives a compressor and it will be clear that the pressure at which such additional combustion equipment operates is normally less than that at which the main combustion equipment operates, and also in operation of the additional combustion equipment combustion has to be maintained in a high velocity heated gas stream.

One important use of additional combustion equipment is in compound gas-turbine engines including multi-stage turbines, whereof more than one stage may drive a compressor stage, the additional combustion equipment being provided between turbine stages to reheat the working fluid leaving one turbine stage prior to its entry into the second turbine stage.

Another important use of such additional combustion equipment in a gas turbine engine is in aircraft reaction propulsion engines, where the exhaust gas from a turbine which drives the compressor, is heated in the exhaust ducting by the provision therein of additional combustion equipment, whereby the gases emerge from the propelling nozzle at higher velocity and the thrust developed is increased.

With aircraft engines, it is often necessary to initiate and to maintain combustion in the exhaust ducting while the aircraft is flying at high altitude, and combustion equipment arrangements hitherto proposed for this use have comprised a pilot fuel nozzle, the intended function of which is to initiate and maintain combustion of fuel supplied through main fuel nozzles.

It has been found that the initiation and maintenance of combustion becomes more difficult as the operating altitude increases, since the extent of the range of air/fuel ratios in which combustion can be maintained, gradually decreases as altitude increases, and the decrease in the available range of ratios becomes critical above a certain altitude. When the additional combustion equipment is in the exhaust ducting, the difficulty in initiating and maintaining combustion is accentuated, due to the reduced pressure in the exhaust ducting. This pressure becomes lower with increase of altitude, and experience has shown that, with the hitherto known arrangements, above a certain critical altitude the initiation of combustion may be impossible or combustion is maintained with difficulty.

The primary object of the present invention is to provide additional combustion equipment for use in a gas turbine engine, which has improved characteristics in respect of the initiation and maintenance of combustion.

According to the present invention, in a gas turbine engine having a compressor, main combustion equipment, a turbine driving said compressor, and an exhaust duct connected to receive the gases exhausting from the turbine, there is provided additional combustion equipment for reheating the gases within the duct and comprising, a combustion chamber, a fuel nozzle to deliver fuel into the combustion chamber, means connected to supply said combustion chamber with air compressed by said compressor and at pressure substantially equal to that in the main combustion equipment, and restricted outlet means from said combustion chamber into said exhaust duct whereof the restriction is such as to maintain the pressure within the combustion chamber approximately at that within the main combustion equipment.

The arrangement of this invention is such that the combustion chamber operates at a pressure which is high with respect to the pressure in the exhaust duct on the downstream side of the turbine, and thus the initiation and maintenance of combustion in the chamber is facilitated.

Preferably the fuel supplied to the fuel nozzle in the combustion chamber constitutes a pilot combustion supply for initiating and maintaining combustion of a main fuel supply delivered into said duct through main fuel injector means, and in this case, the initiation and maintenance of an effective pilot zone of combustion is facilitated and thus the initiation and maintenance of combustion of the main fuel supply is also improved.

Preferably, the combustion chamber includes an outer casing supplied with compressed air from an engine compressor and an inner flame tube structure.

The restricted outlet means in one arrangement comprises a number of hollow arms communicating with the chamber through narrow slots and extending radially from the combustion chamber to convey the products of combustion from the combustion chamber into the exhaust duct for instance into a region into which fuel supplied through the main fuel injector means is carried by the exhaust gas stream. The arms may be perforated or slotted along their trailing edges.

In another arrangement, the restricted outlet means is afforded by a narrow annular gap in the combustion chamber wall, the gap being formed for instance around the base edge of a conical chamber disposed with its base facing downstream.

In yet another arrangement, the restricted outlet means may be in the form of nozzles extending radially of the combustion chamber. For instance in a construction including a flame tube within the combustion chamber the nozzles may form part of the flame tube and be directed towards apertures in the combustion chamber wall.

Conveniently the combustion chamber is located centrally within the exhaust duct.

The main fuel supply is preferably introduced into the exhaust duct at locations upstream of the combustion chamber or the outlet therefrom.

In arrangements where a main fuel supply is introduced into the free stream flowing through the exhaust duct, there may also be provided stabilising devices such as a stabilising ring or stabilising baffles.

Combustion in the additional combustion chamber may conveniently be initiated by means of an electric spark device.

Some arrangements according to the invention will now be described, the arrangements being illustrated in the accompanying drawings in which.

Figure 1:
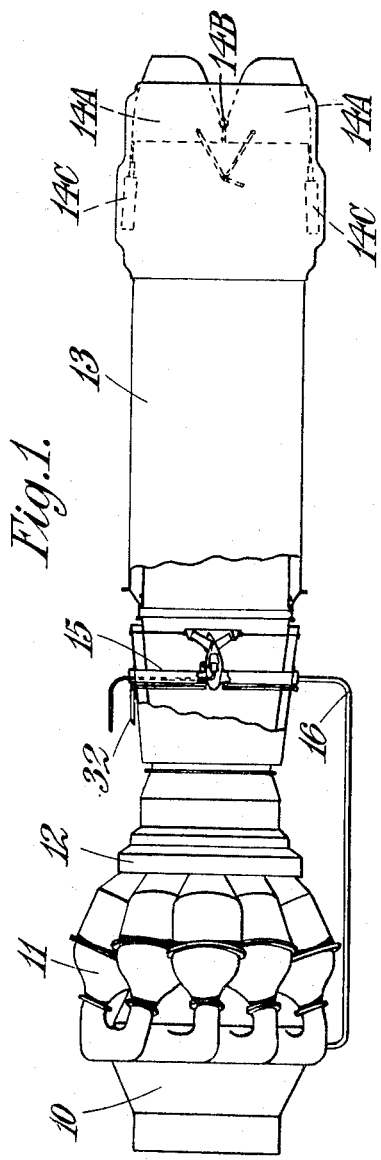
Figure 1 shows diagrammatically one known type of gas turbine engine for aircraft reaction propulsion having additional combustion equipment in the exhaust duct.

Referring to Figure 1, the type of gas turbine engine illustrated comprises a compressor 10, main combustion equipment 11, a turbine 12, exhaust ducting 13, and a propelling nozzle 14. The turbine 12 drives the compressor 10 to compress air which is delivered to the main combustion equipment 11 in which fuel is burnt. The heated gases from the main combustion equipment 11 pass through the turbine 12 and thence through the exhaust ducting 13 to emerge through the propelling nozzle 14 to provide propulsive thrust. Additional combustion equipment is provided in the exhaust duct 13 for the purpose of increasing the exit velocity of the exhaust gases through the propelling nozzle 14, the latter preferably being of the variable area kind comprising in known manner segments 14A pivoted at 14B and operated by jacks 14C to provide a greater effective area when the additional combustion system 15 is operative.

Figure 2:
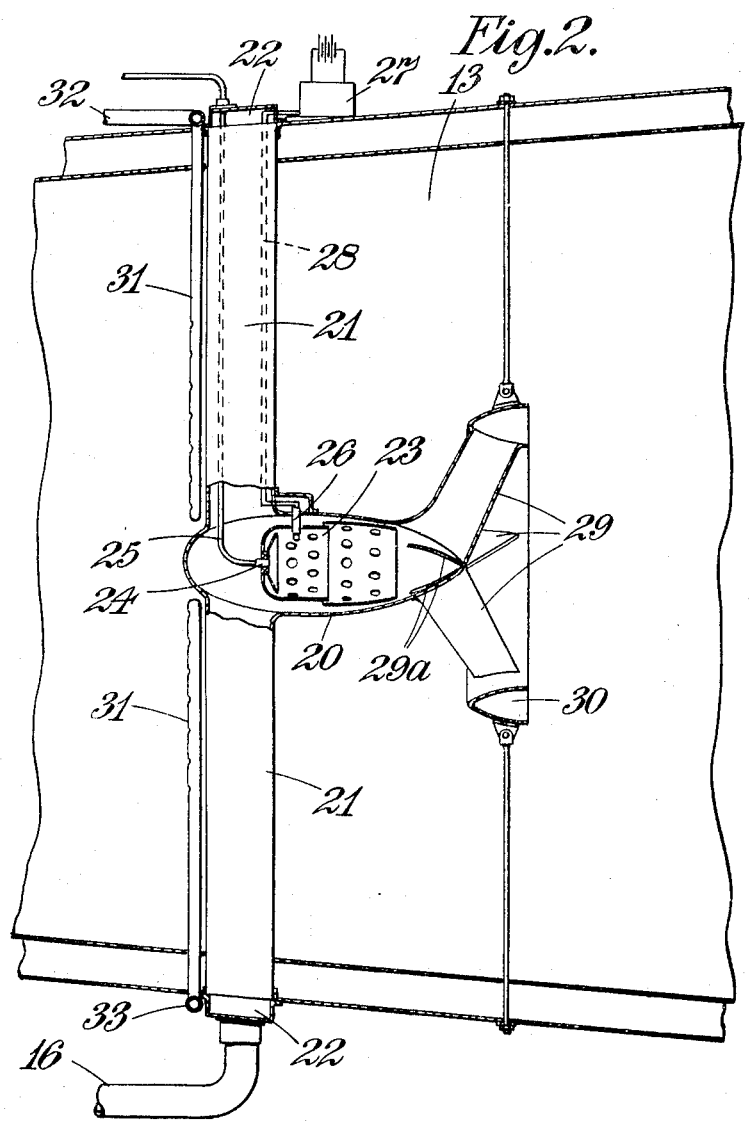
Figure 2 illustrates one embodiment of the additional combustion equipment.
Figure 3:
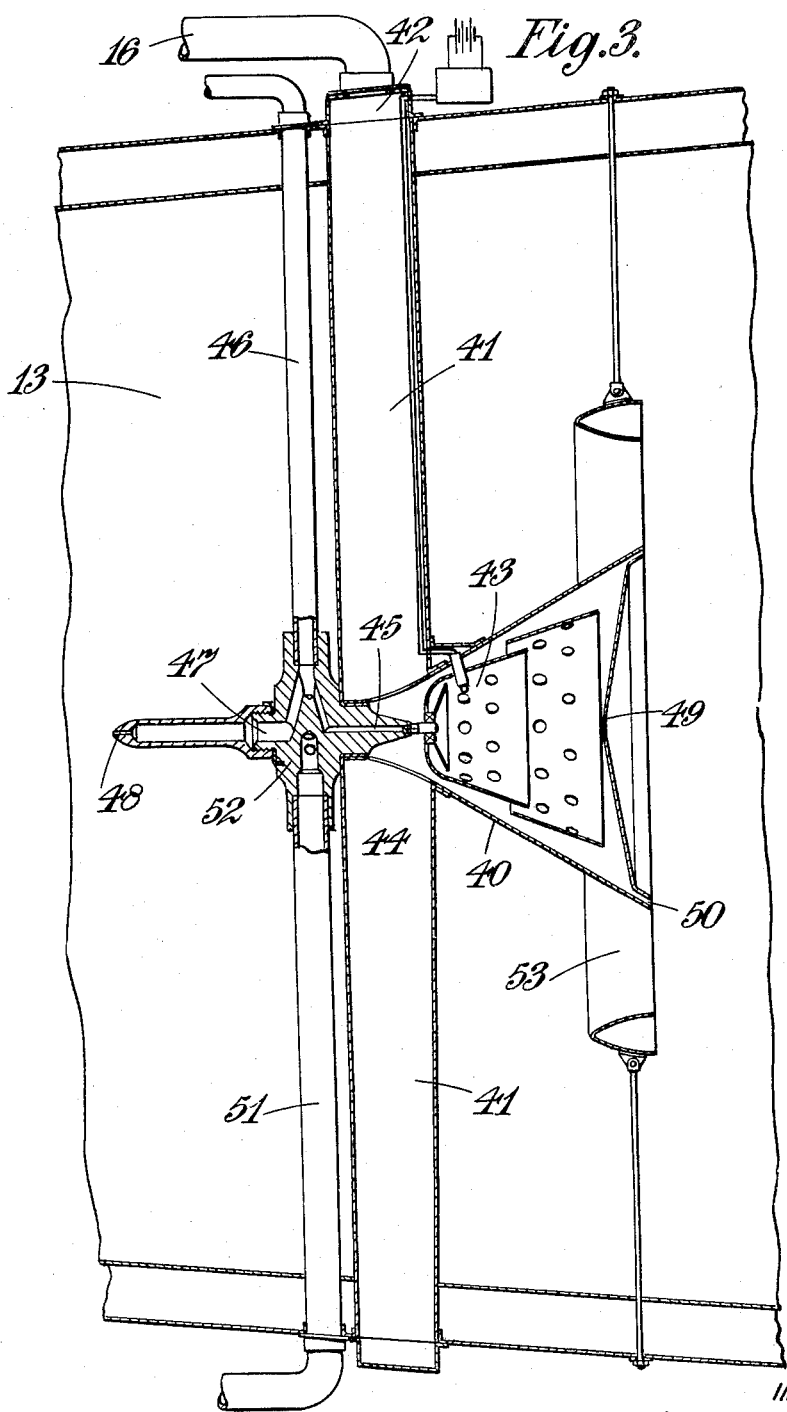
Figure 3 illustrates a second embodiment of the combustion equipment.
Figure 4:
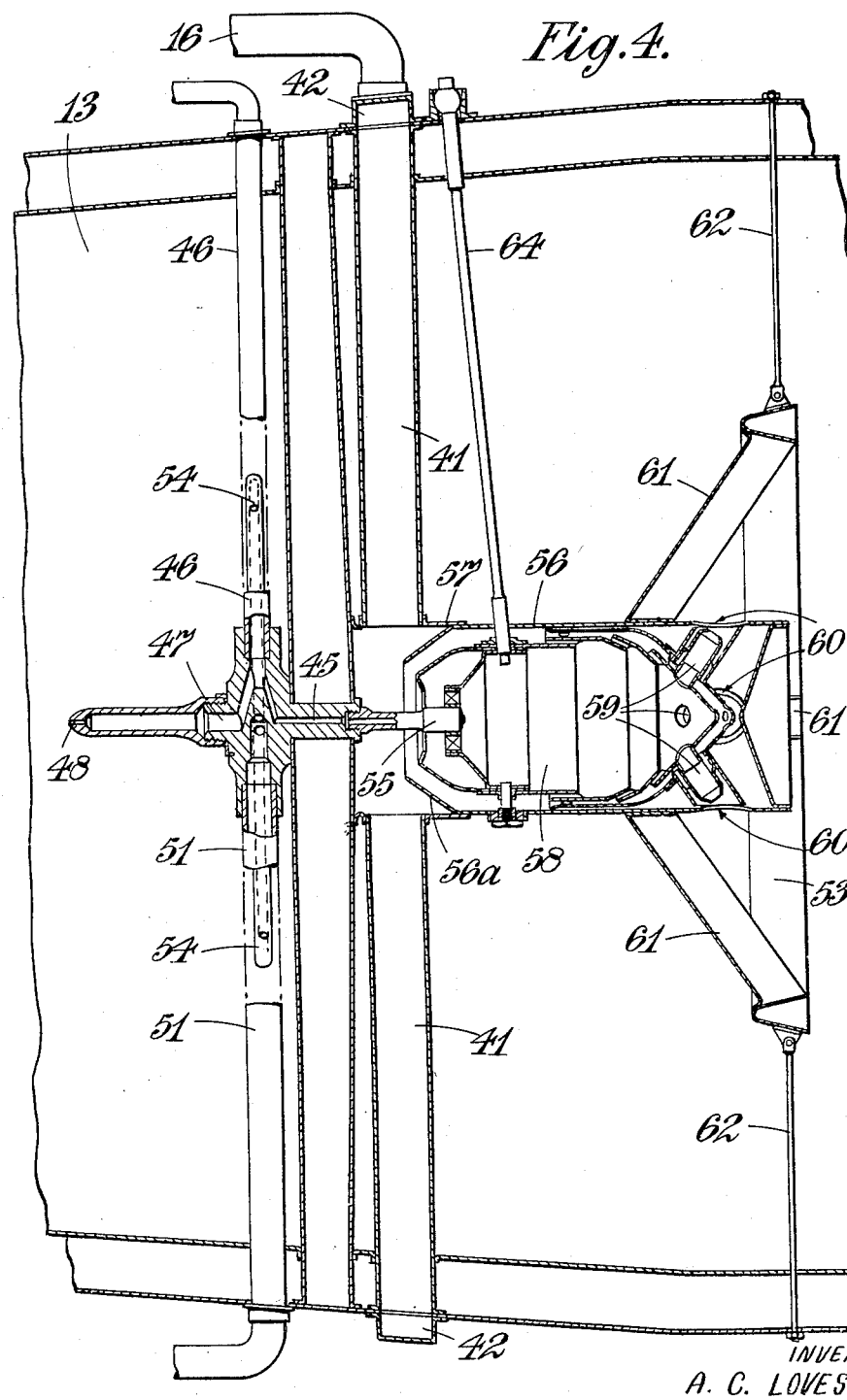
Figure 4 illustrates a third embodiment of the combustion equipment.

As illustrated in Figure 1, air is tapped off from the compressor 10 and led through ducting 16 to the additional combustion equipment 15 embodiments of which are shown in greater detail in Figures 2, 3 and 4. The tapping from the compressor 10 is preferably effected at the outlet of the diffusers of the compressor 10, so that the pressure of the tapped air is substantially equal to that existing in the main combustion equipment 11.

Referring to Figure 2, the embodiment of additional combustion equipment illustrated comprises a combustion chamber including an outer casing 20 which is supported within the exhaust duct 13 by hollow struts 21 extending transversely across the duct 13.

The interior of the casing 20 is in communication with the interior of the hollow struts 21, and the outer ends of the struts 21 communicate with an annular manifold 22 extending peripherally around the outer wall of the exhaust duct 13. The air ducting 16, through which air is tapped from the compressor, is connected to deliver into the manifold 22, so that compressed air is supplied from the compressor through ducting 16, manifold 22 and hollow struts 21 to the interior of the casing 20.

The casing 20 accommodates a flame tube 23. Fuel is supplied to the interior of the flame tube 23 by means of a pilot nozzle 24 which is connected by fuel pipe 25 with a pilot fuel pressure supply. Additionally the combustion chamber includes a spark plug device 26 fed from a high voltage source 27 through leads 28 accommodated within the interior of a strut 21. With this arrangement it will be appreciated that the air which is burnt with fuel supplied by the pilot nozzle 24 is derived from the main compressor at a pressure substantially equal to that existing in the main compressor at a pressure substantially equal to that existing in the main combustion equipment 11, and it is arranged that the pressure within the combustion chamber 20 is maintained to be approximately the same as that within the main combustion equipment by restriction of the outlet from the combustion chamber 20.

The outlet from the chamber 20 comprises a number of outwardly-extending arms 29 which are of aerofoil section and are of a hollow form. The inner end of each arm 29 communicates with the interior of the casing 21 through narrow slots 29a so that the combustion products pass into the arms 29 and flow therethrough to a combustion stabilising annular ring 30. In addition, the trailing edges of the arms 29 are perforated or formed with a continuous slot, so that combustion products exhaust along the trailing edges. In this manner a pilot combustion device is provided which serves to initiate and maintain combustion of fuel which is introduced through main fuel injectors illustrated at 31.

The latter comprise a suitable number of tubes extending radially inwards from the outer wall of the exhaust duct and supplied with fuel through fuel pipe 32 and manifold 33. The pipes 31 are perforated along their radially inner length so as to introduce fuel in an atomised state into the free stream of gas flowing through the exhaust duct. The annular stabilising ring 30 serves to maintain the combustion of the main fuel in a combustion zone immediately downstream thereof.

Referring now to Figure 3, the embodiment of additional combustion equipment illustrated comprises a combustion chamber having a conical wall 40 supported by hollow struts 41 supplied with air from the compressor through ducting 16 and manifold 42.

A flame tube 43 is housed within the casing 40 and a pilot fuel nozzle 44 is fed with fuel through a duct 45 which connects with pipe 46. The pipe 46 is also connected through duct 47 with an auxiliary fuel nozzle 48. The outlet from the combustion chamber is restricted by the provision of a closure plate 49 which provides a narrow annular gap 50 at its periphery. The main fuel supply is effected through fuel pipe 51 to a number of radially-extending arms (not shown) secured to the boss element 52. Fuel is introduced into the free stream of gas flowing through the exhaust duct 13 and combustion is stabilised by means of an annular ring 53.

Referring now to Figure 4, there is illustrated a fuel supply arrangement which is the same as that shown in Figure 3 and which comprises a pilot fuel supply pipe 46 leading to nozzles 48 and duct 45, and a main fuel pipe 51 leading to perforated radial arms 54 through which the main fuel passes into duct 13.

The pilot fuel flowing in duct 45 in this construction passes to a nozzle 55 projecting into a cylindrical casing 56. The casing 56 has a conical open end 56a which fits into a socket 57 carried centrally of the duct 13 by the hollow struts 41, and a closed downstream end. Air flows from manifold 42 through the struts 41 into the socket 57 and thence into the casing 56 through the end 56a.

Within the casing 56 there is a flame tube 58 made up in a number of sections and the downstream section is conical with a series of outwardly extending nozzles 59 which are directed towards outlet apertures 60 in the casing 56. An igniter device 64 projects from the wall of the duct 13 to within the flame tube 58.

A main fuel combustion stabilising ring 53 is provided as in the arrangement of Figure 3 and the ring 53 is connected to the casing 56 by a series of V-section members 61 of which there is one for each aperture 60. The apertures are disposed so that hot gases issuing from the nozzles 59 enter the duct 13 in the wake created by the associated member 61.

In operation, the nozzles 59 act as restrictors and assist to maintain the pressure in the flame tube 58 to be substantially the same as that in the main combustion equipment 11.

Ties 62 (see also Figure 2 and 3) may be provided to support the stabilising ring 53.

Since in the embodiments described, the outlet from the pilot combustion chamber 20, 40, 56 is restricted in such a manner that the pressure within the chamber is higher than that existing within the exhaust duct 13, the initiation and maintenance of pilot fuel combustion is facilitated, thereby providing a region of heated gas for the maintenance of combustion of fuel supplied through the main fuel injectors 31, or 54.

I claim:

1. In a gas-turbine engine having a compressor, main combustion equipment, a turbine driving said compressor, and an exhaust duct connected to receive the gases exhausting from the turbine; additional combustion equipment for reheating the gases within the exhaust duct and comprising closed casing structure supported within the exhaust duct and affording a combustion chamber, a fuel nozzle to deliver fuel into said combustion chamber, means connected to supply said combustion chamber with air compressed by said compressor and at a pressure substantially equal to that in the main combustion equipment, igniter means in said combustion chamber to produce combustion of said fuel and air supplied thereto, and means affording a restricted outlet for hot combustion products from said closed casing structure in said exhaust duct whereof the restriction is such as to maintain the pressure within the combustion chamber approximately at that within the main combustion equipment.

2. Additional combustion equipment as claimed in claim 1, comprising also main fuel injector means to deliver a main fuel supply into said exhaust duct, wherein said combustion chamber having the restricted outlet means constitutes a pilot combustion means for initiating and maintaining combustion of the main fuel supply.

3. Additional combustion equipment as claimed in claim 2, wherein said main fuel injector means are arranged to inject fuel into the exhaust duct upstream of the combustion chamber or the restricted outlet means.

4. Additional combustion equipment as claimed in claim 1, wherein said closed casing structure comprises an outer casing, a conduit connecting said outer casing with the engine compressor, and an inner flame tube structure supported within said outer casing in spaced relation thereto, said fuel nozzle being arranged to deliver fuel into the flame tube structure.

5. Additional combustion equipment as claimed in claim 1, wherein said means affording the restricted outlet comprises a number of hollow arms communicating at their inner ends with said closed casing structure through narrow slots and extending radially outwards from the closed casing structure to convey the products of combustion from the combustion chamber afforded by said closed casing structure into the exhaust duct.

6. Additional combustion equipment as claimed in claim 5, wherein the hollow arms have apertures along their trailing edges to provide outlets therefrom into the exhaust ducts.

7. Additional combustion equipment as claimed in claim 1, wherein the closed casing structure comprises an outer wall of frusto-conical form disposed with its larger end facing downstream in said exhaust duct, and a base wall supported within the larger end of the outer wall with the edge of the base wall spaced from the outer wall to form a narrow annular gap around the base edge to afford the restricted outlet from the combustion chamber.

8. Additional combustion equipment as claimed in claim 1, wherein the closed casing structure comprises a plurality of nozzles extending outwardly therefrom to afford the restricted outlet of the combustion chamber.

9. Additional combustion equipment as claimed in claim 8 wherein the closed casing structure comprises an outer wall and a flame tube within the outer wall and said nozzles forming the restricted outlet means are provided on the flame tube and are directed towards apertures in the outer wall.

10. Additional combustion equipment as claimed in claim 9, comprising a series of V-section members, there being V-section members arranged to extend outwardly from the outer wall at points upstream of each of the apertures for the nozzles.

11. Additional combustion equipment as claimed in claim 1, comprising also main fuel combustion stabilizing devices arranged within said exhaust duct adjacent said means affording the restricted outlet from the combustion chamber.

12. In a gas-turbine engine having a compressor, main combustion equipment, a turbine and an exhaust duct arranged in sequential flow; additional combustion equipment for reheating the gases within the exhaust duct and comprising a closed casing structure mounted within the exhaust duct and providing a combustion chamber, means for delivering fuel into the combustion chamber, means for supplying to said combustion chamber air from said compressor at a pressure substantially equal to that in the main combustion equipment, ignition means in said combustion chamber to produce combustion of the fuel and air supplied thereto, and means providing a restricted outlet for hot combustion products from said closed casing structure, whereby the pressure within the combustion chamber is maintained substantially equal to that within the main combustion equipment.

References Cited in the file of this patent

UNITED STATES PATENTS

| | | |
|---|---|---|
| 2,508,420 | Redding | May 23, 1950 |
| 2,520,388 | Earl | Aug. 29, 1950 |
| 2,561,939 | Meschino | July 24, 1951 |

FOREIGN PATENTS

| | | |
|---|---|---|
| 618,760 | Great Britain | Feb. 25, 1949 |